United States Patent
Krishnamurthy et al.

(10) Patent No.: US 6,928,485 B1
(45) Date of Patent: Aug. 9, 2005

(54) METHOD FOR NETWORK-AWARE CLUSTERING OF CLIENTS IN A NETWORK

(75) Inventors: Balachander Krishnamurthy, New York, NY (US); Jia Wang, White Plains, NY (US)

(73) Assignee: AT&T Corp., New York, NY (US)

( * ) Notice: Subject to any disclaimer, the term of this patent is extended or adjusted under 35 U.S.C. 154(b) by 687 days.

(21) Appl. No.: 09/603,154

(22) Filed: Jun. 23, 2000

Related U.S. Application Data

(60) Provisional application No. 60/151,194, filed on Aug. 27, 1999.

(51) Int. Cl.[7] ............................................. G06F 15/173
(52) U.S. Cl. ...................... 709/242; 709/220; 709/223; 709/224
(58) Field of Search ................................. 709/203, 223, 709/226, 227, 229, 238, 224, 220, 221, 201, 245, 246, 244, 408, 242; 370/408

(56) References Cited

U.S. PATENT DOCUMENTS

| | | | |
|---|---|---|---|
| 5,706,507 A | | 1/1998 | Schloss |
| 5,835,720 A | * | 11/1998 | Nelson et al. ............... 709/224 |
| 5,856,974 A | * | 1/1999 | Gervais et al. ............. 370/392 |
| 6,006,259 A | | 12/1999 | Adelman et al. |
| 6,078,954 A | * | 6/2000 | Lakey et al. ................. 709/223 |
| 6,119,153 A | | 9/2000 | Dujari et al. |
| 6,131,067 A | | 10/2000 | Girerd et al. |
| 6,134,588 A | | 10/2000 | Guenthner et al. |
| 6,182,121 B1 | | 1/2001 | Wiaschin |
| 6,192,417 B1 | | 2/2001 | Block et al. |
| 6,195,622 B1 | | 2/2001 | Altschuler et al. |
| 6,243,761 B1 | | 6/2001 | Mogul et al. |
| 6,266,706 B1 | | 7/2001 | Brodnik et al. |
| 6,295,283 B1 | * | 9/2001 | Falk ............................ 370/325 |
| 6,330,561 B1 | | 12/2001 | Cohen et al. |
| 6,343,320 B1 | * | 1/2002 | Fairchild et al. ............ 709/224 |
| 6,396,842 B1 | * | 5/2002 | Rochberger ................. 370/408 |
| 6,425,014 B1 | * | 7/2002 | Aiken, Jr. et al. .......... 709/230 |
| 6,470,389 B1 | * | 10/2002 | Chung et al. ............... 709/227 |
| 6,532,217 B1 | * | 3/2003 | Alkhatib et al. ............ 370/252 |
| 6,546,424 B1 | * | 4/2003 | Cucchiara ................... 709/226 |
| 6,549,538 B1 | * | 4/2003 | Beck et al. ............ 370/395.52 |
| 6,553,420 B1 | | 4/2003 | Karger et al. |
| 6,560,610 B1 | | 5/2003 | Eatherton et al. |
| 6,611,873 B1 | * | 8/2003 | Kanchara ..................... 709/238 |
| 6,714,975 B1 | | 3/2004 | Aggarwal et al. |
| 6,725,261 B1 | * | 4/2004 | Novaes et al. .............. 709/220 |
| 2002/0129086 A1 | * | 9/2002 | Garcia-Luna-Aceves et al. ........................... 709/200 |
| 2002/0198961 A1 | * | 12/2002 | Krishnamurthy et al. ... 709/217 |
| 2003/0046343 A1 | * | 3/2003 | Krishnamurthy et al. ... 709/203 |
| 2003/0236793 A1 | * | 12/2003 | Karlsson ..................... 707/101 |
| 2004/0059830 A1 | * | 3/2004 | Brown ........................ 709/238 |

(Continued)

OTHER PUBLICATIONS

Gene Cheung, et al., Optimal Routing Table Design for IP Adress Lookus Under Memory Constraints, IEEE Infocom '99 Proceedings, p. 1437–44 (Mar. 23, 1999).*

(Continued)

*Primary Examiner*—Dung C. Dinh
*Assistant Examiner*—Kimberly Flynn

(57) ABSTRACT

A method for clustering together network clients for guiding of placement of network servers is disclosed. A number of routing table prefix/netmask entries are aggregated and unified into a tubular format. The routing table entries may be converted into a singular format. A network server log is used to extract a number of client IP addresses which are compared to the entries within the unified routing table. A common prefix shared by a number of the client IP addresses and an entry in the unified routing table is determined and used to cluster the clients together in a client cluster. Network servers, such as proxy server, cache servers, content distribution servers and mirror server may be placed in the network according to the client clusters.

20 Claims, 3 Drawing Sheets

U.S. PATENT DOCUMENTS

| | | |
|---|---|---|
| 2004/0085928 A1 | 5/2004 | Chari et al. |
| 2004/0088571 A1 * | 5/2004 | Jerrim et al. ............... 713/201 |
| 2004/0090913 A1 * | 5/2004 | Scudder et al. ............ 370/219 |
| 2004/0128618 A1 | 7/2004 | Datta |
| 2004/0153558 A1 | 8/2004 | Gunduc et al. |

OTHER PUBLICATIONS

B. Kristnamurthy and C. E. Williams, Study of Piggyback Cache Validation for Proxy Caches in the World Wide Web, Proceedings of the USENIX Symposium on Internet Technologies and Systems, Monterey, California, Dec. 1997.

U.S. Appl. No. 09/705,325, filed Nov. 3, 2000.

U.S. Appl. No. 09/705,675, filed Nov. 3, 2000.

U.S. Appl. No. 10/213,587, filed Aug. 7, 2002.

U.S. Appl. No. 10/213,611, filed Aug. 7, 2002.

U.S. Appl. No. 10/254,378, filed Sep. 25, 2002.

* cited by examiner

*FIG. 2*
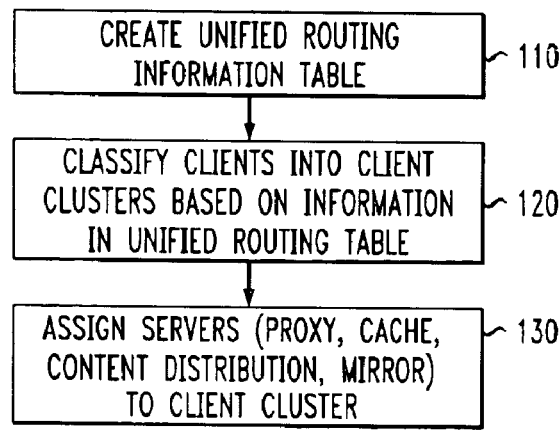
*FIG. 3*
| ROUTES | | AS path |
|---|---|---|
| 134.87.2.0/24 | BCnet | 6509 271 |
| 134.117.0.0 | CARLETON UNIVERSITY | 6509 10786 |
| 137.82.0.0 | UNIVERSITY OF BRITISH COLUMBIA | 6509 271 |
| 137.122.0.0 | UNVERSITY OF OTTAWA | 6509 10786 |
| 170 | 180 | 190 |
160
*FIG. 4*
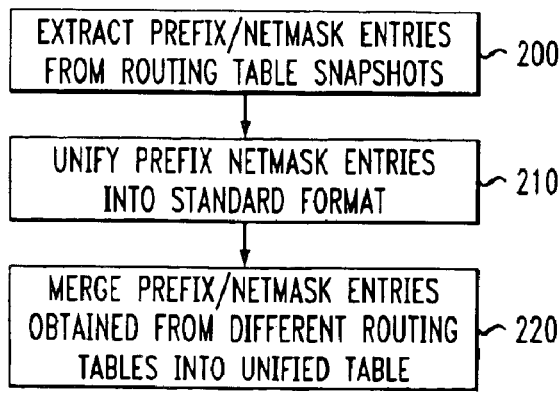

FIG. 5

| FORMATS | x1.x2.x3.x4/k1.k2.k3.k4 | x1.x2.x3.x4/1 | x1.x2.x3.0 |
|---|---|---|---|
| ROUTING TABLES | MAE-EAST<br>MAE-WEST<br>PACBELL<br>PAIX | ARIN<br>AT&T<br>CANET<br>NLANR<br>VBNS | CANET |
| EXAMPLES | 193.1/255.255<br>193.0.128/255.255.192 | 128.148.0.0/16 | 130.15.0.0 |
| UNIFICATION | 193.1/255.255<br>193.0.128/255.255.192 | 128.148.0.0/255.255 | 130.15.0.0/255.255<br>192.75.72/255.255.255 |

230, 240, 250

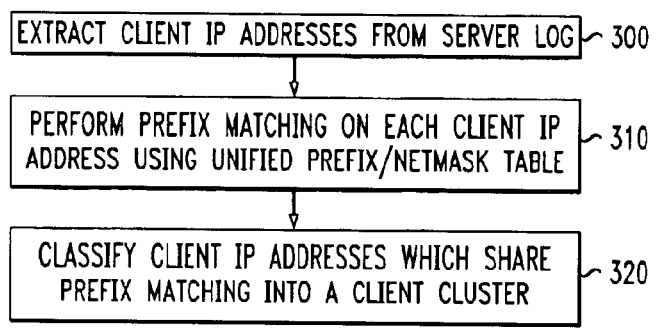

FIG. 6

EXTRACT CLIENT IP ADDRESSES FROM SERVER LOG — 300

PERFORM PREFIX MATCHING ON EACH CLIENT IP ADDRESS USING UNIFIED PREFIX/NETMASK TABLE — 310

CLASSIFY CLIENT IP ADDRESSES WHICH SHARE PREFIX MATCHING INTO A CLIENT CLUSTER — 320

METHOD FOR NETWORK-AWARE CLUSTERING OF CLIENTS IN A NETWORK

This application claims the benefit of U.S. provisional application No. 60/151,194, filed Aug. 27, 1999 and titled SYSTEM AND METHOD FOR NETWORK-AWARE CLUSTERING OF WEB CLIENTS/PROXIES.

BACKGROUND OF THE INVENTION

This invention relates to a method of grouping or clustering clients within a network to optimize and expedite the flow of data within the network.

Servers, such as proxy servers, cache servers, content distribution servers, mirror servers and other related servers are typically used to speed the access of data and reduce response time for network client requests in a network, such as the World Wide Web. Generally, these network clients issue requests for information, such as in the form of a Hypertext Transfer Protocol (HTTP) requests for some information, such as one or more Web pages. These requests are then handled directly or indirectly by these servers, such as proxy servers, caches servers, content distribution servers and mirror servers, to hopefully expedite the accessing and transfer of the requested information.

Generally, these servers either act as intermediaries or as transfer or redirection points for client requests in the network. For example, in operation, a proxy server receives a request for an Internet service (such as a Web page request) from a user. If the request passes filtering requirements, the proxy server looks in its local cache of previously downloaded Web pages. If the server finds the page, the page is returned to the user without needing to forward the request to, for example, a World Wide Web server on the Internet. If the page is not in the cache, the proxy server, acting as a client on behalf of the user, requests the page from the server out on the Internet. When the page is returned, the proxy server relates it to the original request and forwards it on to the client user.

Strategically designing placement of proxies in the network can benefit greatly from clustering network client users who are from the same network together so that the proxy server can adequately and efficiently serve these respective client clusters. Mis-characterizing clients as being in the same network may result in a proxy server being placed such that it impracticably and inefficiently serves these clients resulting in degraded performance in the network.

In the case of, for example, a cache or a content distribution server, the user's HTTP request at an originating server is typically re-routed away from the originating server and on to a cache server "closer" to the user. Generally, the cache server determines what content in the request exists in the cache, serves that content, and retrieves any non-cached content from the originating server. Any new content may also be cached locally in the cache server.

Similar to the strategic placement of proxies, the placement of cache servers, content distribution "boxes" or servers and related mirror servers can be best made by accurately clustering clients together in the network. Performance in the network may thus be improved by accurately and properly clustering multiple network clients together in related client clusters. The servers, whether they are cache servers, content distribution servers and/or mirror servers can then efficiently service these client clusters.

Accordingly, it would be desirable to have a method for accurately clustering clients within a network together to guide placement of proxies, cache servers, content distribution servers and mirror servers within the network.

SUMMARY OF THE INVENTION

The present invention is a method for guiding placement of servers, such as proxy servers, cache servers, content distribution servers and mirror servers within a distributed information network. The method uses information from at least one network log, such as a server log or proxy log, and at least one network routing table to arrange clients into related client clusters. In one embodiment, the method includes the steps of generating a unified prefix/netmask table from a plurality of extracted prefix/netmask entries, extracting a plurality of client IP addresses from the at least one network log, comparing each of the plurality of client IP addresses with entries in the unified/prefix netmask table to determine a common longest matching prefix between each of the plurality of client IP addresses and the entries in the unified/prefix netmask table and grouping all of the client IP addresses which share the common longest matching prefix into at least one client cluster. Each client within a client cluster will share a common network address prefix from the unified routing table with the other clients in the same client cluster.

Preferably, a number of different routing table snapshots are used in extracting entries for the unified prefix/netmask table. These multiple entries from the different prefix/netmask tables are unified into a singular format and then merged into a single table.

Network servers, such as proxy servers, cache servers, content distribution servers and mirror servers may be assigned to one or more clusters based on a number of factors such as the number of clients within the cluster, the number of requests issued, the URLs accessed and the number of bytes fetched from a server, such as a Web server.

BRIEF DESCRIPTION OF THE DRAWINGS

FIG. 2 illustrates an exemplary method in accordance with the teachings of the present invention.

FIG. 3 illustrates an exemplary routing table containing routing information.

FIG. 4 illustrates an exemplary method for creating a unified routing table in accordance with the teachings of the present invention.

FIG. 5 illustrates an exemplary table containing routing information and unified routing information.

FIG. 6 illustrates an exemplary method for clustering clients in accordance with the teachings of the present invention.

DETAILED DESCRIPTION OF THE INVENTION

Figure 1:
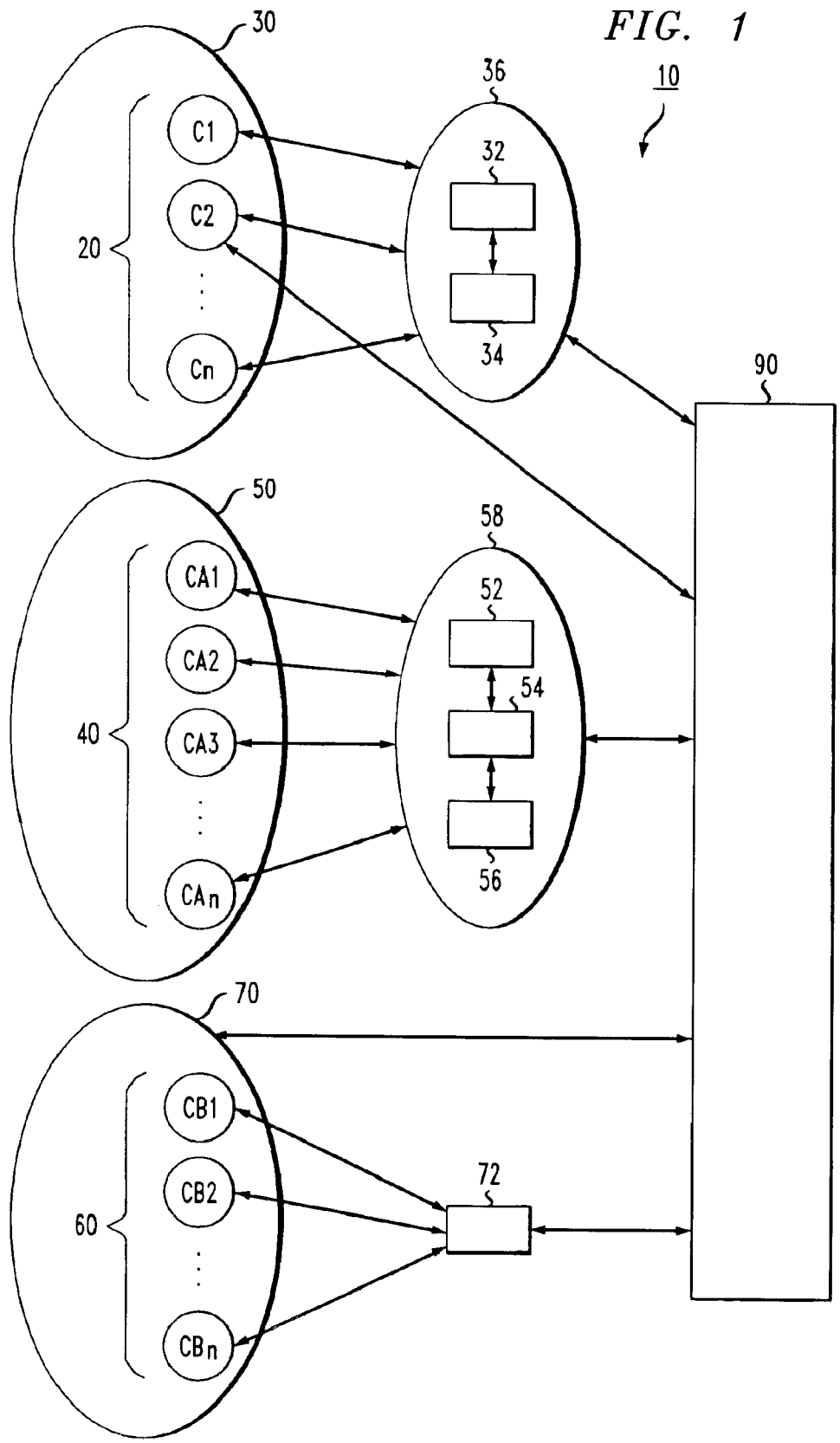
FIG. 1 illustrates an exemplary network configuration in accordance with the teachings of the present invention.

United States provisional application No. 60/151,194, titled SYSTEM AND METHOD FOR NETWORK-AWARE CLUSTERING OF WEB CLIENTS/PROXIES filed Aug. 27, 1999 is hereby incorporated by reference herein in its entirety.

The present invention relates to a method for clustering clients and allocating servers, such as proxy servers, cache servers, content distribution servers and mirror servers, to those client clusters in a distributed information network, such as the World Wide Web. Referring to FIG. 1, an exemplary network 10 configured in accordance with the teachings of the present invention is shown. The network 10 includes a number of clients, such as clients 20 (C1, C2 . .

. Cn) which are clustered together in a client cluster 30, clients 40 (CA1, CA2, CA3 . . . CAn) which are clustered together in a client cluster 50 and clients 60 (CB1, CB2 . . . CBn) which are clustered together in a client cluster 70. Client cluster 30 is in communication with servers 32, 34 which together form a server cluster 36, client cluster 50 is in communication with servers 52, 54 and 56 which form a server cluster 58 and client cluster 70 is in communication with a single server 72. In the present invention, servers 32, 34, 52, 54, 56 and 72 may be any one of proxy servers, cache servers, content distribution servers and/or mirror servers. For example, server 32 and server 34 may be proxy servers such that server cluster 36 is a proxy server cluster.

Server cluster 36 including servers 32 and 34, server cluster 58 including servers 52, 54 and 56, and server 72 are in further communication with a server, such as a World Wide Web server 90. World Wide Web server may be any server available on the Internet which is responsive to requests to and from any one of the clients and/or servers. For example, World Wide Web server may be a server which receives and responds to requests for Web pages related to one or more Web sites which are resident on the server. Other network configurations are possible provided the network servers, such as the network proxy servers, cache servers, content distribution servers and mirror servers are allocated to properly clustered client clusters as discussed in more detail later herein.

In the present invention, the placement and configuration of the servers and server clusters, such as the proxy servers and related proxy server clusters, cache servers and related cache server clusters, content distribution servers and content distribution server clusters and mirror servers and related mirror server clusters depends on the clustering of clients within the network. For example, using a content caching scheme for illustrative purposes, a client may issue a request for content, such as HTTP request to a World Wide Web server. This may be performed by the Web client clicking on a URL that is "content-delivery enabled", i.e. the URL includes the use of a special routing code that redirects the Web page request to the optimum or "closest" server. This "content-delivery enabled" URL will re-route that client's request away from the site's originating Web server and on to a cache server or cache server cluster, that is better suited to serve the client.

Referring to FIG. 2, an exemplary embodiment of a method for clustering clients and assigning or allocating servers to these client clusters is shown. In this embodiment, a unified routing information table is created, step 110. The unified routing information table, preferably includes routing information from one or more routing tables, such as network routing prefix and netmask information. For background purposes, a netmask is a series of bits designed to "mask" or conceal certain portions of an IP address. Typically, the standard netmask for a class C network like is 255.255.255.0 where the "255.255.255" prefix portion identifies the network number and the last octet, ".0", is the actual machine number or subnetwork number. Referring again to FIG. 2, clients within the network are classified into client clusters based on information from the unified routing information table, step 120. Servers, such as proxy servers, cache servers, network distribution servers and mirror servers may then be assigned to these client clusters, step 130, as discussed in more detail later herein.

As shown in FIG. 2, the present invention utilizes routing table information from, preferably, two or more routing tables to create a unified routing information table. For background purposes, a router is a device or, in some cases, software in a computer, that determines the next network point to which a packet should be forwarded toward its destination. The router decides which way to send each information packet based on its current understanding of the state of the networks it is connected to. Typically, routers create or maintain a routing table of the available routes and their conditions and uses this information along with distance and cost algorithms to determine the best route for a given packet. An exemplary routing table or routing table "snapshot" 160 is shown in FIG. 3. As shown, the routing table or routing table snapshot 160 may include information such network prefix and netmask information 170, network identification information 180 and AS path information 190. Other additional information such as next hop IP address and AS number, etc may also be available via the network routing table. In an exemplary embodiment, as discussed above, information from a plurality of routing tables are used to create the unified routing table for use in clustering clients together.

Referring to FIG. 4, an exemplary method for creating a unified routing table is shown. To create the unified table, a number of prefix/netmask entries are extracted from a number of routing tables or routing table snapshots, step 200. Although only a single routing table or routing table snapshot may be used, preferably two or more routing tables or routing table snapshots are used since any one table is unlikely to contain the desired information on all the necessary prefix/netmask entries. Each router in a network such as the World Wide Web will typically only see a limited set of traffic, thereby it is desirable to use a multiplicity of different routing tables from different routers in order to obtain a more complete set of routing information. The prefix/netmask entries from the various tables are unified into a single standardized format, step 210, as discussed in more detail later herein. The standardized prefix/netmask entries are then merged into a single unified table, step 220, to aid in clustering together clients in the network. Typically, the unified routing table will be created periodically to incorporate possibly updated information from the routing tables in the network. The unified routing table may be created or generated at any interval such as every two hours, once a month or ten times a year as desired.

Referring to FIG. 5, a network prefix/netmask entry may be in one of three formats as shown in a tabular form. A first exemplary format 230 is configured generally as x1.x2.x3.x4/k1.k2.k3.k4 and is used in exemplary routing tables MAE-EAST, MAE-WEST, PACBELL AND PAIX, where x1.x2.x3.x4/k1.k2.k3.k4 are network prefix and netmask respectively with zeroes dropped at the end or tail. One such example is 193.1/255.255, which corresponds to 193.1.0.0/255.255.0.0, where 193.1.0.0 and 255.255.0.0 are network prefix and netmask, respectively.

Referring again to FIG. 5, another exemplary network prefix/netmask entry format 240 may also be configured as x1.x2.x3.x4/1 as in routing tables at ARIN, AT&T, CANET, NLANR AND VBNS, where x1.x2.x3.x4 is the prefix and 1 is the netmask length. For example, 128.148.0.0/16 stands for 128.148.0.0/255.255.0.0, where 128.148.0.0 and 255.255.0.0 are network prefix and netmask. Additionally, another exemplary prefix/netmask entry format 250 may be configured as x1.x2.x3.0 which can also be found in CANET, and is an abbreviated representation of x1.x2.x3.0/k1.k2.k3.0. For example, 130.15.0.0 is an abbreviated representation of 130.15.0.0/255.255.0.0. Of course, other formats may exist and may be utilized herein provided the different formats are standardized to a singular format to aid in clustering clients in the network.

In the present invention, the network prefix/netmask entries are unified into a single standardized format as previously discussed herein and shown as step 210 in FIG. 4. Any one of the formats as discussed above or other network prefix/netmask formats that may exist will preferably be converted into this single standardized format. In one exemplary embodiment, the format x1.x2.x3.x4/k1.k2.k3.k4 is chosen as the standardized format. For instance, any network prefix/netmask entries in the format of x1.x2.x3.x4/1 and/or the format x1.x2.x3.0 will be converted into the format x1.x2.x3.x4/k1.k2.k3.k4 such that prefix/netmask entries 128.148.0.0/16, 130.15.0.0 and 192.75.72.0 will be converted respectively into 128.148/255.255, 130.15/255.255 and 192.75.72/255.255.255. These converted prefix/netmask entries are then tabulated into a single unified table with prefix/netmask entries existing in all the same format. This table may be in a simple tabular form with the multiple prefix/netmask entries listed in a grid array form.

Referring now to FIG. 6, an exemplary method for clustering clients using the unified prefix/netmask table is shown. A number of client IP addresses are first extracted from a network server log, step 300. The server log may be any generally available server log, such as a World Wide Web server log which collects client request information to the Web server. The extracted client IP addresses are matched with the entries in the unified prefix/netmask table to determine a common network address prefix, step 310. Such matching may be performed by conducting a longest prefix matching on each client IP address with each of the entries in the unified prefix/netmask table. Once prefix matching has been performed, the client IP addresses are clustered into respective client clusters, step 320. In each respective client cluster, each of the clients within a client cluster will share a common prefix, or more specifically, a common longest matching prefix from the unified prefix/netmask table. A threshold for prefix matching may be set such that a client IP address has to have at least a certain number of matching digits in the client IP address prefix with any one of the prefix/netmask entries in the unified prefix/netmask table before a match is declared. For example, in one embodiment, a client IP address may have to prefix match at least four digits of any one of the prefix/netmask entries in the unified prefix/netmask table to be considered a match.

Once clients have been clustered together in client clusters as discussed above, servers, such as proxy servers, cache servers, content distribution servers and/or mirror servers may be placed or assigned to these client clusters. Preferably, in the case of proxy servers, the proxy servers being assigned to these client clusters will be functioning as cache servers and thereby their optimum assignment or placement will depend greatly on the proper clustering of these clients. In the present invention, the servers may be assigned to these client clusters based on one or more factors or metrics such as the number of clients, the number of requests issued, the URLs accessed, the number of bytes fetched from a server and other related factors. In one embodiment, more than one server, such as a proxy server, cache server, content distribution server and/or mirror server may be assigned to the same client cluster or clusters such that the servers will together form a server cluster, as discussed earlier herein. The servers within a server cluster will act in concert with one another to service their respective client cluster(s).

In one example, proxy servers, cache servers, content distribution servers and/or mirror servers may be assigned to a client cluster based simply on the number of clients in the respective client cluster. For example, a client number threshold may be set such that a server may be assigned for every instance of the client number threshold reached. A threshold may be set at any number such as 100, 500 or a 1000 clients. In an exemplary embodiment, where the client number threshold is set at 500, a client cluster containing 4000 clients will require and be assigned at least eight (8) servers, whether they may be proxy servers, cache servers, content distribution servers and/or mirror servers. These eight servers together will form a server cluster which will be placed in front of the client cluster in the network to service the clients requests to and from the Internet.

In another example, proxy servers, cache servers and/or content distribution servers may be assigned to one or more client clusters based on the number of requests, such as HTTP request, which are issued by the clients within each respective client cluster. For example, a request threshold may be set such that a server may be assigned for client clusters which issue a certain number of requests which equals or exceeds the threshold. A threshold may be set at any number depending on the anticipated capacity of the server to be assigned to the client cluster.

In another exemplary embodiment, at least one server, such as a proxy server, cache server, content distribution server and/or mirror server, may be placed in front of each client cluster. The servers may be further grouped into server clusters based on their respective AS numbers and respective geographical locations. In this example, all servers belonging to the same AS and located geographically nearby will be grouped together to form a server cluster. In addition, in some instances, undesirable network spiders and conflicting proxy servers are eliminated from a client cluster before placing a server, such as a proxy server, cache server, content distribution server and/or mirror server to server that client cluster.

It will be apparent to those skilled in the art that many changes and substitutions can be made to the system and method described herein without departing from the spirit and scope of the invention as defined by the appended claims.

We claim:

1. A method of clustering a plurality of client IP addresses within a distributed information network, the method comprising the steps of:

generating a unified prefix/netmask table from a plurality of network routing table prefix/netmask entries;

comparing each of the plurality of client IP addresses with the unified prefix/netmask table to determine a common prefix between each of the plurality of client IP addresses and at least one of the entries in the unified prefix/netmask table; and grouping client IP addresses which share a common prefix into a network client cluster.

2. The method of claim 1, wherein the step of generating a unified prefix/netmask table from a plurality of network routing table prefix/netmask entries includes the steps of:

extracting the prefix/netmask entries from a plurality of network routing tables; and converting the prefix/netmask entries into a standardized format.

3. The method of claim 1, wherein the client IP addresses are extracted from a network log.

4. The method of claim 3, further comprising:

identifying existing spiders and/or proxies within the network log.

5. The method of claim 1, further comprising:
placing one or more servers in front of a network client cluster, wherein the servers are at least one of proxy servers, cache servers, content distribution servers and mirror servers.

6. The method of claim 1, wherein the common prefix is the common longest matching prefix from the unified prefix/netmask table.

7. The method of claim 1, wherein the distributed information network is the World Wide Web.

8. A method for guiding placement of servers within a distributed information network using at least one network server log and at least one network routing table from the distributed information network; the method comprising:
extracting a plurality of prefix/netmask entries from the at least one network routing table;
generating a unified prefix/netmask table from the plurality of extracted prefix/netmask entries;
extracting a plurality of client IP addresses from the at least one network server log;
comparing each of the plurality of client IP addresses with entries in the unified/prefix netmask table to determine a common longest matching prefix between each of the plurality of client IP addresses and the entries in the unified/prefix netmask table; and
grouping all of the client IP addresses which share the common longest matching prefix into at least one client cluster.

9. The method of claim 8, wherein generating a unified prefix/netmask table from the plurality of extracted prefix/netmask entries includes:
converting the prefix/netmask entries into a standardized format.

10. The method of claim 8, wherein the servers are selected from the group consisting of proxy servers, cache servers, content distribution servers and mirror servers.

11. The method of claim 8, wherein each client cluster is assigned one or more servers.

12. The method of claim 8, further comprising:
assigning one or more servers to each client cluster based on the number of requests issued by the client within each client cluster.

13. A method for clustering clients, the method comprising:
creating a unified table of routing address information;
comparing one or more client IP addresses with the unified routing table to determine which client IP addresses belong to a common network; and
clustering together the client IP addresses which belong to the common network into client clusters,
wherein comparing one or more client IP addresses with the unified routing table to determine which client IP addresses belong to a common network includes extracting the one or more IP addresses from at least one server log.

14. A method for clustering clients, the method comprising:
creating a unified table of routing address information;
comparing one or more client IP addresses with the unified routing table to determine which client IP addresses belong to a common network;
clustering together the client IP addresses which belong to the common network into client clusters; and
assigning servers to client clusters based on the number of clients comprising each client cluster and the number of requests issued by those clients.

15. A method for clustering clients, the method comprising:
creating a unified table of routing address information;
comparing one or more client IP addresses with the unified routing table to determine which client IP addresses belong to a common network;
clustering together the client IP addresses which belong to the common network into client clusters; and
assigning servers to the client clusters, wherein the servers are at least one of proxy servers, cache servers, content distribution servers and mirror servers.

16. A computer-readable medium storing executable instructions which cause a computer to perform the steps of:
creating a unified routing table from a plurality of routing table entries extracted from two or more network routing tables;
prefix matching a plurality of client IP addresses with the entries in the unified routing table; and
clustering client IP addresses which share common prefixes from the unified routing table into client clusters, wherein each client cluster will be serviced by at least one proxy server.

17. The computer-readable medium of claim 16, wherein creating a unified routing table from a plurality of routing table entries extracted from two or more network routing tables includes converting the plurality of routing table entries into a standardized format.

18. The computer-readable medium of claim 16, wherein the plurality of clients IP addresses are extracted from a server log.

19. The computer-readable medium of claim 16, wherein the common prefix is the longest matching prefix between the IP addresses in a client cluster and one of the unified routing table entries.

20. The computer-readable medium of claim 16, wherein the server is one of a proxy server, a cache server, a content distribution server and a mirror server.

* * * * *